United States Patent [19]

Tangonan et al.

[11] Patent Number: 4,711,514

[45] Date of Patent: Dec. 8, 1987

[54] PRODUCT OF AND PROCESS FOR FORMING TAPERED WAVEGUIDES

[75] Inventors: Gregory L. Tangonan, Oxnard; Huan-Wun Yen, Westlake; David L. Persechini, Santa Monica, all of Calif.

[73] Assignee: Hughes Aircraft Company, Del.

[21] Appl. No.: 690,792

[22] Filed: Jan. 11, 1985

[51] Int. Cl.⁴ .............................................. G02B 6/12
[52] U.S. Cl. ................... 350/96.12; 65/30.13; 148/187; 148/188; 148/DIG. 35; 350/96.34; 427/163; 427/165
[58] Field of Search ............... 350/96.11, 96.12, 96.34; 148/178, 181, 182, 183, 186, 187, 188, DIG. 35; 65/30.13; 428/213, 216; 427/163, 165

[56] References Cited

U.S. PATENT DOCUMENTS

| 3,816,222 | 6/1974 | Plumat et al. | 428/213 |
| 3,836,348 | 9/1974 | Sumimoto et al. | 65/30.13 |
| 4,169,009 | 9/1979 | Wagner et al. | 156/636 |
| 4,206,251 | 6/1980 | Chen | 350/96.12 X |
| 4,262,995 | 4/1981 | Tangonan | 350/96.16 |
| 4,278,322 | 7/1981 | Mahlein | 350/96.18 |
| 4,372,641 | 2/1983 | Johnson et al. | 350/96.12 |

OTHER PUBLICATIONS

Giallorenzi et al., "Optical Waveguides Formed by Thermal Migration of Ions in Glass," *Applied Optics*, vol. 12, No. 6, Jun. 1973, pp. 1240-1244.
Aksenov et al., "Plane Optical Waveguide Formed by K+ Diffusion in Glass," *Sov. Tech. Phys. Lett.*, vol. 4, No. 11, Nov. 1978, pp. 560-561.
Viljanen et al., "Fabrication of Optical Strip Waveguides with Nearly ...," *J. Appl. Phys.*, vol. 51, No. 7, Jul. 1980, pp. 3563-3565.
S. E. Miller, "Integrated Optics: An Introduction", Bell System Tech. Journal, vol. 48 (1969) pp. 2059-2069.
E. G. Spencer et al., "Ion-Beam Techniques for Device Fabrication", Journal of Vacuum Science and Technology", vol. 8, No. 5, Journal of Facuum Science, (1972), pp. 552-570.

*Primary Examiner*—John Lee
*Attorney, Agent, or Firm*—V. D. Duraiswamy; V. G. Laslo; A. W. Karambelas

[57] ABSTRACT

A method of forming a tapered optical waveguide within a substrate (2). An appropriate substrate (2) is coated with a layer of barrier material (4) such as silicon dioxide which provides a relatively tight matrix relative to the open matrix of the substrate (2). The barrier material (4) is deposited on the substrate with a sloping variable thickness that is inversely related to the desired depth of the waveguide taper. The barrier material (4) can be deposited through a vacuum deposition technique and subsequently subjected to ion-milling to provide the desired taper. An appropriate source of metal ions (6), such as silver, capable of being transferred, such as by diffusion into the substrate (2) for increasing the refractive index and thereby defining a waveguide, is then transmitted to and through the barrier material (4). The metal (6) may be coated on the tapered barrier material (4), and then diffused into the substrate (2) through the barrier material (4) which provides a controlled transmission of the ions proportional to its thickness. The substrate (2) can then be cleaned to strip both the barrier material (4) and residual metal (6) for subsequent processing. The resulting product of this process is a superior tapered optical waveguide device that can be economically manufactured.

30 Claims, 3 Drawing Figures

PRODUCT OF AND PROCESS FOR FORMING TAPERED WAVEGUIDES

BACKGROUND OF THE INVENTION

The present invention provides an improved and low cost tapered waveguide suitable for use in integrated optics applications. More specifically, an optical waveguide having a tapered structure and a process for manufacturing the same from a relatively low cost substrate material is highly desirable in the electro-optical field.

With the increased application of integrated optics, there has been created a demand to improve the manufacturing processes of optical waveguides. The advantages of optical waveguides and their integration in electro-optical devices is well known, and has become even more significant in the miniaturization of various electro-optical devices. Such systems are described, e.g., by S. E. Miller in "Integrated Optics: An Introduction", *Bell System Technical Journal*, Vol. 48 (1969), pp. 2059–2069, and the manner in which they can be manufactured has been described by E. G. Spencer et al., "Ion Beam Techniques for Device Fabrication", *Journal of Vacuum Science and Technology*, Vol. 8 (1972), pp. 552–570. Recently, semiconductor lasers have been significantly reduced in size and improved, and now provide a source of coherent electromagnetic radiation which requires waveguides for transmitting such radiation, for example, as a communication medium. Proposed optical communication systems may comprise light sources, waveguides and active components such as, e.g., modulators, deflectors and switches. Waveguides may be of a type known as optical fibers, or, more recently, they have taken the form of patterned transparent films on a substrate, the latter type being particularly suited for miniaturized, complex optical circuits. The ability for the waveguides to carry a large amount of information across a wide band of frequencies suggests numerous advantages over the more conventional electrical waveguide structures. As can be readily appreciated, it is highly desirable that the tapered waveguide provide an efficient, low cost coupling with low loss of energy.

The prior art has recognized the necessity and advantages of utilizing tapered waveguide structures for coupling with light sources and for interfacing or coupling two optical waveguides having a different cross-sectional area. However, considerable problems have existed for providing this coupling arrangement, and the prior art has resorted to not only tapering a waveguide in a substrate such as lithium niobate, but also has attempted to produce conical gradient lenses such as disclosed in U.S. Pat. No. 4,278,322.

U.S. Pat. No. 4,372,641 discloses a conventional method of making a tapered waveguide structure wherein a mask is deposited on a substrate, leaving exposed the desired optical path whose width diminishes. Side walls of the mask may be straight or undercut, and waveguide material such as, for example, an appropriate glass, can be deposited through the mask, e.g., by electron beam deposition.

The disclosure of U.S. Pat. No. 4,262,995, which represents the work of one of the co-inventors, Gregory L. Tangonan, is of interest for its discussion of the formation of optical waveguide sections and tapered or horn-shaped wave transition sections in a soda-lime glass substrate by an ion exchange process where, for example, a metal ion is substituted for the sodium ion in the glass substrate to form the waveguide. Thus, the prior art has recognized the advantages of tapered optical waveguides and their formation in relatively inexpensive substrate material such as soda-lime glass, but has still not been able to optimize the process of producing the tapered waveguide, nor the necessity for fabricating planar waveguides that usually require tedious handling and polishing of the guide surfaces at an angle to form the tapered guide. Finally, reference is made to U.S. Pat. No. 4,169,009, of general interest, to disclose waveguide formations through the use of ion beam milling and precise mechanical and chemomechanical manufacturing methods.

There is still a need in the prior art to provide an improved process of making and producing a tapered waveguide.

SUMMARY OF THE INVENTION

The present invention provides a method of economically forming a tapered optical waveguide within a substrate comprising the steps of providing an appropriate substrate; coating the substrate with a layer of a barrier material which can optimally be subsequently removed from the substrate. The barrier material such as silicon dioxide, $SiO_2$, provides a relatively tight matrix or atomic structure relative to the open matrix of the substrate. The barrier material is provided on the substrate with a sloping variable thickness that is inversely related to the desired depth of the waveguide taper. The barrier material can be deposited through a vacuum deposition technique on the substrate, and then subsequently subjected to an ion milling step to provide the desired taper. An appropriate source of metal ions that are capable of being transferred, such as through a diffusion process, into the substrate for increasing the refractive index and defining the waveguide, is then transmitted to and through the barrier material. A metal such as silver may be coated on the tapered barrier material, and then subjected to both heat and an electrical field for a predetermined period of time to ensure the adequate diffusion of the silver ions into the substrate through the barrier material. The barrier material provides a controlled transmission of the ions proportional to the thickness of the barrier material to provide the desired tapered waveguide in the substrate. A soda glass can be used, for example, as a substrate, and the sodium ions can be replaced with the silver ions as a result of the application of the electric field. The substrate can then be cleaned to strip both the barrier material and the residual silver for subsequent processing. The resulting product of this process is a superior tapered optical waveguide device that can be economically manufactured and whose physical structure is representative of the process of the present invention.

The features of the present invention which are believed to be novel can be best understood, together with further objects and advantages, by reference to the following description, taken in conjunction with the accompanying drawings.

DESCRIPTION OF THE PREFERRED EMBODIMENT

The following specification, taken in conjunction with the drawings, sets forth the tapered waveguide device and process steps of the present invention in such a manner than any person skilled in the electro-optical field can utilize the invention. The embodiment of the invention disclosed herein is the best mode contemplated by the inventors of carrying out their invention, although it should be undestood that various modifications can be accomplished within the parameters of the invention.

The operation of an optical waveguide is based on the fact that when a medium, which is transparent to light, is surrounded or otherwise bounded by another medium having a lower refractive index, light introduced along the inner medium's axis is highly reflected at the boundary with the surrounding medium, thus producing a light guiding effect. The optical waveguides referred to within the parameters of the present invention are more particularly formed in an appropriate substrate. As can be appreciated, various factors will cause losses in the transmission capabilities of a waveguide. For example, in a multimode waveguide, modal dispersion can be a severe problem if, for example, high resolution coupler-decouplers are desired. The use of a tapered waveguide having a controlled thickness can minimize the transmission losses.

Figure 1:
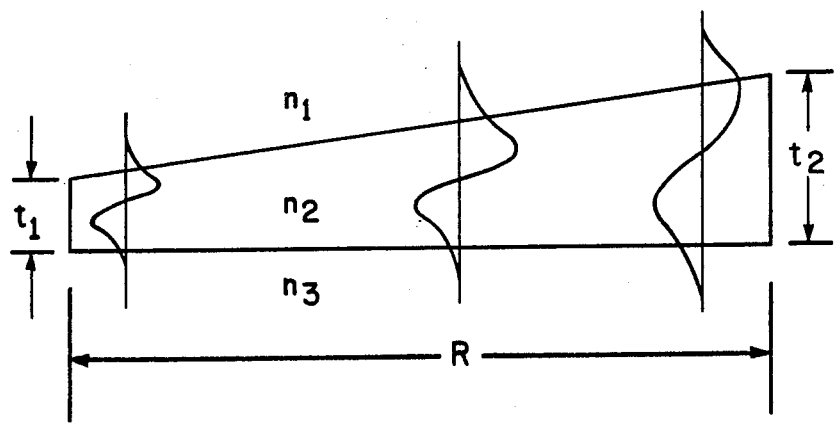
FIG. 1 is a schematic illustration of a tapered waveguide.

Referring to FIG. 1, it can be seen that a waveguide having an index of refraction $n_2$ is provided in a substrate of an index of refraction $n_3$. The thickness of the waveguide increases adiabatically (that is, without any significant optical propagation losses) from an initial value of $t_1$ to a final value of $t_2$ over the entire device length R. Assuming that this thin waveguide can support N modes for a given wavelength of transmission, if the waveguide thickness is allowed to increase adiabatically, then the original modes of the thin waveguide will excite only the corresponding modes (same mode number) in the thicker waveguide section. In other words, the adiabatic process does not allow mixing of guided modes to take place. Therefore, as the modes of the thinner waveguide evolve into the modes of the thicker waveguide, the effective index of the modes changes continuously, as can be seen from the wave pattern produced at different sections in FIG. 1. Thus a tapered waveguide is a desirable structure in an integrated optical device.

However, the expense of providing the tapered waveguide is a function of the increased waveguide loss (radiation loss) and the fabrication complexity. The increased power of semiconductor laser devices and the reduced length of transmission in miniaturized integrated optical devices has made tapered waveguides more desirable. The barrier of fabrication complexity and epxense, however, has limited their utilization. If the waveguide taper is not perfect, optical scattering can occur, which results in the excitation of higher order modes, as well as excessive radiation modes. This, in turn, will affect the device insertion loss and cross-talk isolation.

Figure 2:
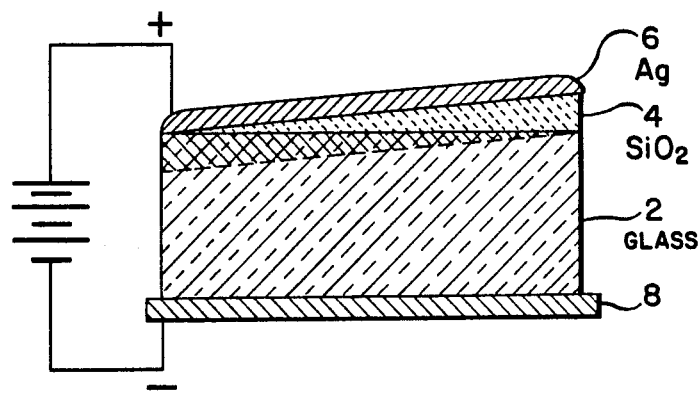
FIG. 2 is a schematic cross-sectional view of a substrate being processed in accordance with the teachings of the present invention.
Figure 3:
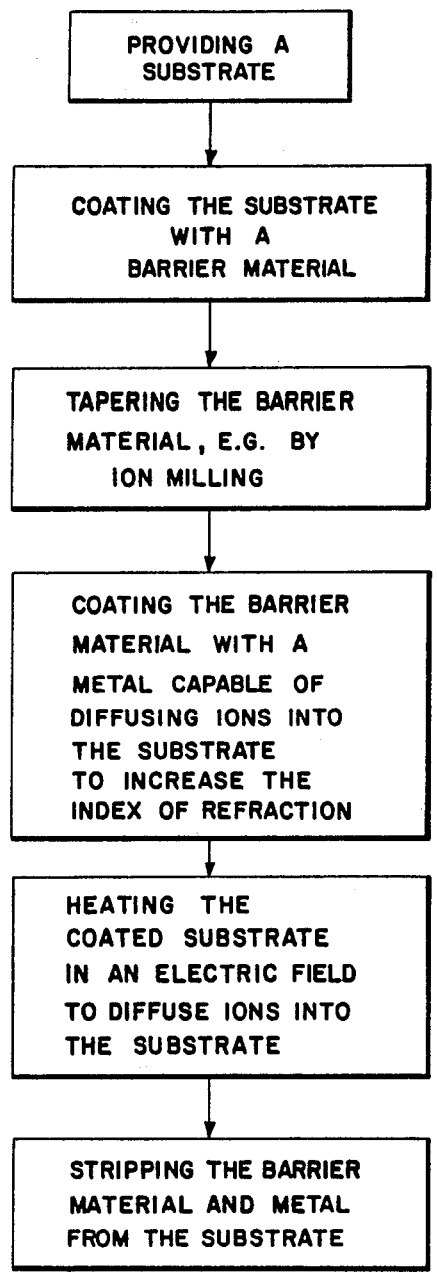
FIG. 3 is a block diagram of the process steps.

Referring to FIG. 2, a schematic illustration of an arrangement for producing the desired tapered waveguide of the present invention in an optical substrate is disclosed. The method steps set forth in FIG. 3 can be utilized in understanding the structure of FIG. 2. A substrate 2 such as a noncrystalline material, for example, borosilicate glass or soda-lime glass, is coated with a barrier material 4 such as silicon dioxide, $SiO_2$, that has a relatively tighter matrix structure in its molecular arrangement than the substrate glass 2. The term "matrix structure" is referring to the permittivity of the free space about the atoms. Silicon dioxide can be vacuum deposited to form a relatively pinhole-free homogeneous coating of several thousand angstroms in thickness. The barrier material should be relatively inert and strippable or removable from substrate 2 after the formation of the tapered waveguide. The prime function of the barrier material is to provide a proportional transmission factor based on its thickness to the diffusion ions that are to be integrated into the substrate. The silicon dioxide material is subsequently tapered, for example, through the use of conventional ion milling to provide a relatively precise and controlled tapered structure that will be inversely proportional to the desired depth of the tapered waveguide. That is, the maximum thickness of barrier material 4 will coincide with the minimum thickness of the tapered waveguide and will proportionally vary to the minimum thickness of the barrier material being provided over the maximum thickness of the tapered waveguide, as shown in FIG. 2. A metal coating 6 such as silver (potassium is also a possible candidate) is then deposited on top of barrier material 4 to serve as a source of diffusion ions.

In the embodiment of FIG. 2, a maximum thickness of 1500 angstroms of silicon dioxide was coated with 300 angstroms of silver. An electrode 8 was attached to glass substrate 2, and the silver electrode was attached to a voltage source to create an electrical field whereby silver ions will penetrate through barrier layer 4 and will replace sodium ions in, for example, a soda-line glass substrate 2. The substrate and coating can be heated to approximately 350° C, then subjected to an 800 V/m electrical field for a time period of approximately one hour. The heating will increase the free vibration of the atoms while the field will drive the atoms in the appropriate directions. The temperature, electrical field and time period are variable and interrelated.

Subsequently, the barrier material and the silver metal is stripped by conventional processes such as chemical dipping. As a result of the present invention, tapers of 15 to 100 μm thickness over distances greater than 2 centimeters can be created in glass substrates using silicon dioxide blocking layers with a tapered thickness of 0 to 2000 angstroms. The previous prior art requirements of ion milling and polishing to achieve a tapered configuration are eliminated to permit a highly advantageous, low cost production of optical waveguides in an appropriate substrate.

By adhering to the parameters and design considerations set forth in the above specification, a technician in the electro-optical arts is capable of providing an improved tapered optical waveguide device by utilizing the process steps of the present invention. While the parameters of the present invention can be found in the above example, this example of the preferred embodiment should not be considered limiting, but rather illustrative of the advantages of the present invention.

What is claimed is:

1. A method of forming a tapered waveguide comprising the steps of:
    providing a substrate;

coating the substrate with a layer of barrier material having a variable thickness inversely related to the depth of the waveguide taper desired;

coating the barrier material with a compatible material capable of transferring ions of said compatible material into the substrate to increase the index of refraction of the substrate, the barrier material providing a controlled transmission of ions proportional to the thickness of the barrier material; and diffusing the ions into the substrate to form the tapered waveguide.

2. The method of claim 1 wherein said substrate is a noncrystalline material.

3. The method of claim 1 wherein said layer of barrier material is $SiO_2$.

4. The method of claim 1 wherein said substrate is selected from a group consisting of borosilicate glass and soda-lime glass.

5. The method of claim 1 wherein the diffusion step further comprises applying an electric field.

6. The method of claim 5 wherein the electric field is approximately 800 V/m.

7. The method of claim 1 wherein the ion material is a metal.

8. The method of claim 7 wherein the ion material is silver.

9. The method of claim 1 wherein the coating of barrier material is further subject to the step of ionmilling a predetermined taper prior to coating the barrier material with a material capable of diffusing ions into the substrate.

10. The method of claim 9 wherein the taper in the barrier material has a minimum taper thickness of 0 Å or higher and a maximum taper thickness on the order of 2000 Å or lower.

11. The method of claim 1 further including the step of heating the substrate to a temperature of approximately 350° C during the diffusing step.

12. The method of claim 11 wherein the substrate is subject to diffusion for a period of about one hour.

13. The method of claim 12 further including the step of applying an electric field of approximately 800 V/m during the diffusion.

14. The method of claim 13 wherein said barrier material is $SiO_2$, the substrate is a glass material and the material capable of transferring ions is silver.

15. A method of forming a tapered waveguide comprising the steps of:

providing a glass substrate of a relatively open matrix structure;

coating the substrate with a barrier material having both a relatively tighter matrix structure than said glass substrate and a variable thickness inversely related to the sloping depth of the taper desired for the waveguide; and diffusing ions of a compatible material through the tighter matrix structure for penetration into the glass substrate to increase the attenuation of surface waves, the tighter matrix structure providing a controlled diffusion of ions proportional to the thickness of the barrier material whereby the diffusion rate of ions is modified and the tapered waveguide is formed in the glass substrate.

16. The method of claim 15 wherein said barrier material is $SiO_2$.

17. The method of claim 15 wherein said substrate is selected from a group consisting of borosilicate glass and soda-lime glass.

18. The method of claim 15 wherein the ion material is a metal.

19. The method of claim 18 wherein the ion material is silver.

20. The method of claim 15 wherein the coating of said substrate with a barrier material of relatively tighter matrix structure is further subject to the step of ion-milling a predetermined taper prior to the diffusion step.

21. The method of claim 20 wherein the taper in the barrier material has a minimum taper thickness of 0 Å or higher and a maximum taper thickness on the order of 2000 Å or lower.

22. The method of claim 15 further including the step of heating the substrate to a temperature of approximately 350° C. during the diffusing step.

23. The method of claim 22 further including the step of applying an electric field to assist the diffusion.

24. The method of claim 23 wherein the substrate is subject to diffusion for a period of about one hour.

25. The method of claim 23 wherein the electric field is approximately 800 V/m.

26. The method of claim 25 wherein the barrier material is $SiO_2$, the substrate is a glass material and the compatible material is silver.

27. The method of claim 26 further including the step of removing the silver and $SiO_2$ from the substrate.

28. A tapered optical waveguide device formed by the diffusion of metal ions into a glass substrate through a barrier material of a relatively tight matrix compared to the glass substrate, by a process comprising:

(a) coating the glass substrate with an inert removable barrier material having a tapered thickness inversely related to the sloping depth of the taper desired for the waveguide;

(b) diffusing metal ions through the barrier material into the glass substrate in the presence of elevated heat and an electrical field, the metal ions having a characteristic of increasing the refractive index in the glass substrate and the diffusion process continuing for a period of time sufficient to produce the predetermined depth and slope of the tapered waveguide in the glass substrate, and (c) removing the barrier material and any metal on the barrier material.

29. The device of claim 28 wherein the substrate is selected from a group consisting of borosilicate glass and soda-lime glass, the barrier material is $SiO_2$ and the metal ions are silver.

30. The device of claim 29 wherein the maximum taper thickness is within the range of 15 to 100 μm.

* * * * *